United States Patent
Arai

(10) Patent No.: US 9,732,796 B2
(45) Date of Patent: Aug. 15, 2017

(54) SINTERED METAL BEARING AND METHOD FOR PRODUCING SAME

(71) Applicant: NTN CORPORATION, Osaka (JP)

(72) Inventor: Takao Arai, Mie (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 15/022,042

(22) PCT Filed: Sep. 4, 2014

(86) PCT No.: PCT/JP2014/073343
§ 371 (c)(1),
(2) Date: Mar. 15, 2016

(87) PCT Pub. No.: WO2015/045784
PCT Pub. Date: Apr. 2, 2015

(65) Prior Publication Data
US 2016/0230811 A1    Aug. 11, 2016

(30) Foreign Application Priority Data

Sep. 24, 2013 (JP) .................................. 2013-196974

(51) Int. Cl.
*F16C 32/06* (2006.01)
*F16C 33/14* (2006.01)
(Continued)

(52) U.S. Cl.
CPC .......... *F16C 33/145* (2013.01); *F16C 17/107* (2013.01); *F16C 33/107* (2013.01);
(Continued)

(58) Field of Classification Search
CPC .. F16C 33/145; F16C 33/107; F16C 2220/20; G11B 19/2036; H02K 5/1672
See application file for complete search history.

(56) References Cited

U.S. PATENT DOCUMENTS 6,105,250 A    8/2000 Tanaka et al.
6,357,920 B1 * 3/2002 Mori ...................... F16C 17/02
                                                                  384/114
(Continued)

FOREIGN PATENT DOCUMENTS

JP    2001-12470      1/2001
JP    2001-291983    10/2001
(Continued)

OTHER PUBLICATIONS

International Search Report issued Dec. 9, 2014 in International (PCT) Application No. PCT/JP2014/073343.
(Continued)

*Primary Examiner* — Thomas R. Hannon
(74) *Attorney, Agent, or Firm* — Wenderoth, Lind & Ponack, L.L.P.

(57) ABSTRACT

A sintered metal bearing is formed through sintering of a compact obtained through compression molding of raw-material powder. The sintered metal bearing includes chamfered portions that are respectively formed at least along outer rims of both end surfaces of the sintered metal bearing, and a dynamic pressure generating portion formed on an inner peripheral surface of the sintered metal bearing by sizing. An axial dimension of each of the chamfered portions is set larger than a radial dimension of the each of the chamfered portions, and a difference in axial dimension between the chamfered portions on one end side and another end side in an axial direction of the sintered metal bearing is set larger than a difference in radial dimension between the chamfered portions on the one end side and the another end side in the axial direction.

14 Claims, 7 Drawing Sheets

(51) Int. Cl.
  *G11B 19/20* (2006.01)
  *F16C 17/10* (2006.01)
  *F16C 43/02* (2006.01)
  *F16C 33/10* (2006.01)
  *F16C 35/02* (2006.01)
  *H02K 5/167* (2006.01)
  *F16C 33/08* (2006.01)

(52) U.S. Cl.
  CPC .............. *F16C 35/02* (2013.01); *F16C 43/02* (2013.01); *G11B 19/2036* (2013.01); *G11B 19/2045* (2013.01); *H02K 5/1672* (2013.01); *F16C 33/08* (2013.01); *F16C 2220/20* (2013.01); *F16C 2226/40* (2013.01); *F16C 2240/40* (2013.01); *F16C 2240/42* (2013.01); *F16C 2240/46* (2013.01); *F16C 2360/46* (2013.01); *H02K 5/1675* (2013.01)

(56) References Cited

U.S. PATENT DOCUMENTS

| 8,926,183 | B2 * | 1/2015 | Noda | F16C 32/0633 384/100 |
|---|---|---|---|---|
| 2002/0009242 | A1 | 1/2002 | Okamura et al. | |
| 2002/0009243 | A1 | 1/2002 | Okamura et al. | |
| 2002/0048418 | A1 | 4/2002 | Okamura et al. | |
| 2008/0067890 | A1 | 3/2008 | Tamaoka | |
| 2009/0022438 | A1 | 1/2009 | Tamaoka | |

FOREIGN PATENT DOCUMENTS

| JP | 2004-360863 | 12/2004 |
|---|---|---|
| JP | 3607492 | 1/2005 |
| JP | 2008-39064 | 2/2008 |
| JP | 2008-101772 | 5/2008 |

OTHER PUBLICATIONS

International Preliminary Report on Patentability and Written Opinion of the International Searching Authority issued Mar. 29, 2016 in International (PCT) Application No. PCT/JP2014/073343.

Extended European Search Report issued Feb. 14, 2017 in corresponding European Application No. 14849162.4.

Notice of Reasons for Refusal issued Apr. 7, 2017 in corresponding Japanese Application No. 2013-196974, with English translation.

* cited by examiner

SINTERED METAL BEARING AND METHOD FOR PRODUCING SAME

TECHNICAL FIELD

The present invention relates to a sintered metal bearing and a method of manufacturing the same.

BACKGROUND ART

A sintered metal bearing is used under a state in which a lubricating oil is impregnated into inner pores thereof. The lubricating oil impregnated into the sintered metal bearing seeps into a sliding portion with respect to a shaft, which is inserted along an inner periphery of the sintered metal bearing, along with relative rotation of the shaft, to thereby form an oil film. The sintered metal bearing is configured to rotationally support the shaft through this oil film. Such a sintered metal bearing has excellent rotational accuracy and quietness, and hence has been suitably used as a bearing device for a motor to be mounted to various electrical apparatus such as information apparatus. Specifically, the sintered metal bearing has been suitably used in a spindle motor for an HDD or a disk drive for a CD, a DVD, and a Blu-ray disc, a polygon scanner motor for a laser beam printer (LBP), or a fan motor.

As an example of sintered metal bearings of this type, there has been known a sintered metal bearing in which, in order to achieve further improvement in quietness and prolongation of life, a dynamic pressure generating portion such as dynamic pressure generating grooves is formed on an inner peripheral surface and/or an end surface of the bearing. As a method of molding the dynamic pressure generating grooves in this case, there has been proposed what is called dynamic pressure generating groove sizing. In this sizing, for example, a sintered compact is press-fitted to an inner periphery of a die, and is compressed in an axial direction by upper and lower punches so that a molding die on an outer periphery of a sizing pin that is inserted in advance along an inner periphery of the sintered compact is caused to bite into the sintered compact. With this, a pattern of the molding die, specifically, a pattern corresponding to the dynamic pressure generating grooves is transferred onto an inner peripheral surface of the sintered compact. In this way, the dynamic pressure generating grooves are molded (refer, for example, to Patent Literature 1). Further, in this case, when molding dies corresponding to dynamic pressure generating grooves are formed also on end surfaces of the upper and lower punches in advance, dynamic pressure generating grooves are molded also in both the end surfaces of the sintered compact besides the inner peripheral surface of the same.

Incidentally, in recent years, in accordance with downsizing and thinning of information apparatus, there have been demands also for downsizing of various motors to be built in the information apparatus. Meanwhile, performance required of the various motors remains unchanged. In view of the circumstance, there have also been proposed information apparatus each including a plurality of such built-in motors. Specifically, there have been proposed electronic apparatus such as a personal computer including two built-in cooling fan motors so that predetermined cooling performance is secured. More specifically, in order, for example, to eliminate unevenness in cooling and to arrange air intake/exhaust passages in right-left symmetry, there has been provided a configuration in which built-in fan motors that differ in rotation direction of the fan from each other (forward rotation and reverse rotation) are arrayed one by one (refer, for example, to Patent Literature 2).

CITATION LIST

Patent Literature 1: JP 3607492 B2
Patent Literature 2: JP 2001-291983 A

SUMMARY OF INVENTION

Technical Problem

Note that, in a case where the dynamic pressure generating grooves formed into patterns corresponding respectively to the rotation directions of spindles are formed in both the end surfaces of the sintered metal bearing described above, when this bearing is built upside down into the fan motor, one of the end surfaces on upper and lower sides may be used as a thrust bearing surface for forward rotation, and another one of the end surfaces may be used as a thrust bearing surface for reverse rotation. When such a use mode can be employed, sintered metal bearings of a single type can be used in both the motors for the forward rotation and the reverse rotation, which is significantly desirable from a viewpoint of production efficiency.

However, in consideration of actual production processes, it is difficult to mass-produce the sintered metal bearings that can be used interchangeably as both the bearings for motors for the forward rotation and the reverse rotation by being inverted upside down as described above. Specifically, in the case where the sintered metal bearing is used upside down as described above, irrespective of which of the end surfaces on the upper and lower sides is used, equivalent bearing rigidities need to be exerted in thrust directions. Note that, the bearing rigidities in the thrust directions are influenced by magnitudes of dynamic pressures to be generated by the dynamic pressure generating grooves formed in each of the end surfaces, and the magnitudes of the dynamic pressures are determined based on patterns and sizes (groove depths or lengths) of the dynamic pressure generating grooves. Meanwhile, in sintered metal bearings of this type, in consideration of efficiency in assembly to a shaft portion or a housing, chamfered portions are generally formed along outer rims and inner rims of the end surfaces (refer, for example, to Patent Literature 1). There is a restriction on changes in outer diameter dimension and inner diameter dimension of the sintered metal bearing in view of radial dimensions of the shaft portion and the housing. Thus, when the lengths of the dynamic pressure generating grooves are set large, it is inevitable to reduce radial dimensions of the chamfered portions.

Meanwhile, in a case where the sintered metal bearing is fixed through bonding to the housing, those chamfered portions function as a kind of an adhesive agent reservoir. Thus, in a case where the radial dimensions of the chamfered portions are unnecessarily reduced, when the sintered metal bearing is introduced from one end side in an axial direction under a state in which an adhesive agent is applied to an inner peripheral surface of the housing, the adhesive agent forced out in an introduction direction cannot be received in a clearance (adhesive agent reservoir) between the chamfered portion and the inner peripheral surface of the housing. As a result, the adhesive agent may flow around to reach the end surface of the sintered metal bearing. For this reason, an allowable range of the radial dimensions of the chamfered portions is significantly small.

However, in a dynamic pressure generating groove sizing step as a final pressing step, in order to allow a sizing pin to be smoothly withdrawn after the dynamic pressure generating grooves are molded in the inner peripheral surface of the sintered compact, spring-back needs to be caused by an appropriate amount in a radial direction. Thus, it is inevitable that a press-fitting margin of the sintered compact be set large relative to the die. However, the amount of spring-back is increased in proportion to the radial press-fitting margin. Therefore, the radial dimensions of the chamfered portions on an upper end side and a lower end side after sizing are liable to significantly fluctuate. As a result, a significant difference in radial dimension occurs between the chamfered portions of both the end surfaces, which fact causes significant difficulties in designing dimensions that allow both thrust bearing areas and a capacity for retaining the adhesive agent to be secured.

In view of the circumstances described above, the present invention has been made to achieve a technical object of providing a sintered metal bearing capable of using each end surface as a thrust bearing surface by inverting the sintered metal bearing upside down.

Solution to Problem

The above-mentioned object is achieved by a sintered metal bearing according to one embodiment of the present invention. That is, this sintered metal bearing has a feature in a sintered metal bearing that is formed through sintering of a compact obtained through compression molding of raw-material powder, the sintered metal bearing comprising: chamfered portions that are respectively formed at least along outer rims of both end surfaces of the sintered metal bearing; and a dynamic pressure generating portion formed on an inner peripheral surface of the sintered metal bearing by sizing, wherein an axial dimension of each of the chamfered portions is set larger than a radial dimension of the each of the chamfered portions, and wherein a difference in axial dimension between the chamfered portions on one end side and another end side in an axial direction of the sintered metal bearing is set larger than a difference in radial dimension between the chamfered portions on the one end side and the another end side in the axial direction. Note that, the "axial dimension of each of the chamfered portions" refers to an axial separation clearance from one end to another end in the axial direction of a region of the sintered metal bearing in which each of the chamfered portions is formed, and the "radial dimension of the each of the chamfered portions" refers to a radial separation clearance from a radially outer end to a radially inner end of the region in which each of the chamfered portions is formed.

Hitherto, the chamfered portions that are respectively formed along the outer rims of the end surfaces have not been seriously taken into consideration. However, the present invention has been made with focus on those chamfered portions, and shapes and sizes thereof are optimized from viewpoints of thrust bearing areas and a capacity for retaining an adhesive agent. Specifically, although a radial dimension and an axial dimension of related-art chamfered portions (each having an inclination angle of 45°, for example) are set equal to each other, the axial dimension is set larger than the radial dimension. Further, the difference in axial dimension between the chamfered portions on the one end side and the another end side in the axial direction, which is inevitably caused by spring-back that occurs at the time of molding the dynamic pressure generating portion through the sizing, is set relatively large so that the difference in radial dimension between the chamfered portions on the one end side and the another end side in the axial direction is relatively reduced. In this way, by designing the shapes of the chamfered portions in accordance with elaborate setting of the axial dimension of each of the chamfered portions, the radial dimension of each of the chamfered portions can be reduced, and the difference in radial dimension between the upper end side and the lower end side can be reduced as much as possible. With this, areas of both the end surfaces arranged on a radially inner side with respect to the chamfered portions can be set relatively large. In this way, the thrust bearing areas can be secured. Further, in bearings of this type, there is a design margin (allowable range) of an axial dimension relative to a radial dimension. Thus, even when the axial dimension of each of the chamfered portions is set relatively large, there is no problem with a bonding strength. In this way, according to the present invention, the chamfered portions that allow not only thrust bearing performance and radial bearing performance as described above but also the strength of bonding to a housing to be secured can be designed.

Further, in the sintered metal bearing according to the one embodiment of the present invention, the difference in axial dimension between the chamfered portions may be set to 0.05 mm or more and 0.1 mm or less, and the difference in radial dimension between the chamfered portions may be set to 0.02 mm or less. By setting those ranges, also when dynamic pressure generating grooves serving as the dynamic pressure generating portions are molded through the sizing on the inner peripheral surface and both the end surfaces as described below, a necessary and sufficient radial bearing rigidity and a necessary and sufficient thrust bearing rigidity can be exerted, and a necessary and sufficient bonding strength can be exerted.

In addition, the sintered metal bearing described above may be suitably provided as, for example, a fluid-dynamic bearing device, comprising: this sintered metal bearing; a shaft portion inserted along an inner periphery of the sintered metal bearing; and an end-surface facing portion configured to be rotated integrally with the shaft portion and to face any one of end surfaces of the sintered metal bearing. Further, in this case, the sintered metal bearing may further comprise: a dynamic pressure generating portion formed on one end surface of the sintered metal bearing, the dynamic pressure generating portion having a pattern that corresponds to forward rotation of the shaft portion under a state in which the one end surface is arranged so as to face the end-surface facing portion; and a dynamic pressure generating portion formed on another end surface of the sintered metal bearing, the dynamic pressure generating portion having a pattern that corresponds to reverse rotation of the shaft portion under a state in which the another end surface is arranged so as to face the end-surface facing portion.

Further, in this case, the fluid-dynamic bearing device according to the one embodiment of the present invention may further comprise a housing having an inner peripheral surface to which the sintered metal bearing is fixed with an adhesive agent, the adhesive agent being retained between the inner peripheral surface of the housing and corresponding one of the chamfered portions.

Still further, the fluid-dynamic bearing device described above comprises the sintered metal bearing capable of suitably using both the upper and lower end surfaces as thrust bearing surfaces. Thus, a fan motor comprising this fluid-dynamic bearing device and a fan mounted to the shaft portion can also be suitably provided.

Still further, for this reason, the fan motor described above may be suitably provided as an information apparatus comprising, as the fan motor, two types of fan motors that differ in rotation direction of the fan from each other.

In addition, the above-mentioned object of the present invention is achieved also by providing a method of manufacturing a sintered metal bearing according to one embodiment of the present invention. That is, this method of manufacturing a sintered metal bearing has a feature in a method of manufacturing a sintered metal bearing, comprising the steps of: subjecting raw-material powder to compression molding to obtain a molded green compact; sintering the molded green compact to obtain a sintered compact; and sizing the sintered compact so as to mold a dynamic pressure generating portion on an inner peripheral surface of the sintered compact, wherein the subjecting raw-material powder to compression molding comprises molding chamfered portions respectively at least along outer rims of both end surfaces of the molded green compact, and wherein the sizing the sintered compact is performed so that a value of 0.25 or more and 1.5 or less is obtained when an axial sizing amount of each of the chamfered portions is divided by a radial sizing amount of the each of the chamfered portions. Note that, the "axial sizing amount" refers to a variation amount of the axial dimension of each of the chamfered portions before and after the sizing, and the "radial sizing amount" refers to a variation amount of the radial dimension of each of the chamfered portions before and after the sizing.

In this way, in the method of manufacturing a sintered metal bearing according to the one embodiment of the present invention, in the sizing for molding the dynamic pressure generating portion, the axial sizing amount, which is almost zero or, if any, significantly smaller than the radial sizing amount in the related art, is intentionally set larger. In the present application, this amount is represented by the rates with respect to the radial sizing amount. By setting the axial sizing amount larger than those in the related art, even when the axial dimensions of the chamfered portions at the upper end and the lower end after the sizing are somewhat different from each other, the difference in radial dimension can be set as small as possible in contrast thereto. With this, the dynamic pressure generating portion having a sufficient size (depth) can be formed on the inner peripheral surface, and a fluctuation of each of the radial dimensions of the chamfered portions at the upper end and the lower end can be suppressed. Thus, the radial dimensions themselves can be designed so as to be smaller than those in the related art. As a result, each of the end surfaces is allowed to have a sufficiently large thrust bearing area. Irrespective of which of the end surfaces is used as a thrust bearing surface, a required thrust bearing rigidity can be exerted.

Further, in the method of manufacturing a sintered metal bearing according to the one embodiment of the present invention, a value of 0.5 or more and 1.0 or less may be obtained when the axial sizing amount of each of the chamfered portions is divided by the radial sizing amount of the each of the chamfered portions. By setting those ranges, also when the dynamic pressure generating grooves serving as the dynamic pressure generating portions are molded through the sizing on the inner peripheral surface and both the end surfaces as described below, a necessary and sufficient radial bearing rigidity and a necessary and sufficient thrust bearing rigidity can be exerted.

Further, in the method of manufacturing a sintered metal bearing according to the one embodiment of the present invention, the subjecting raw-material powder to compression molding may comprise molding the chamfered portions so that an axial dimension of each of the chamfered portions of the molded green compact is larger than a radial dimension of the each of the chamfered portions of the molded green compact.

Advantageous Effects of Invention

As described above, according to the one embodiment of the present invention, the chamfered portions are designed so that not only the thrust bearing performance and the radial bearing performance as described above but also the strength of bonding to the housing is secured. Thus, it is possible to provide the sintered metal bearing capable of using each end surface as the thrust bearing surface by inverting the sintered metal bearing.

DESCRIPTION OF EMBODIMENTS

Now, description is made of an embodiment of the present invention with reference to the drawings. Note that, in the following description, with respect to a sintered metal bearing, a disc portion side of a hub portion is referred to as "upper side," and a lid member side is referred to as "lower side." As a matter of course, where and how actual products are set or used are not limited by those upper and lower directions.

Figure 1:
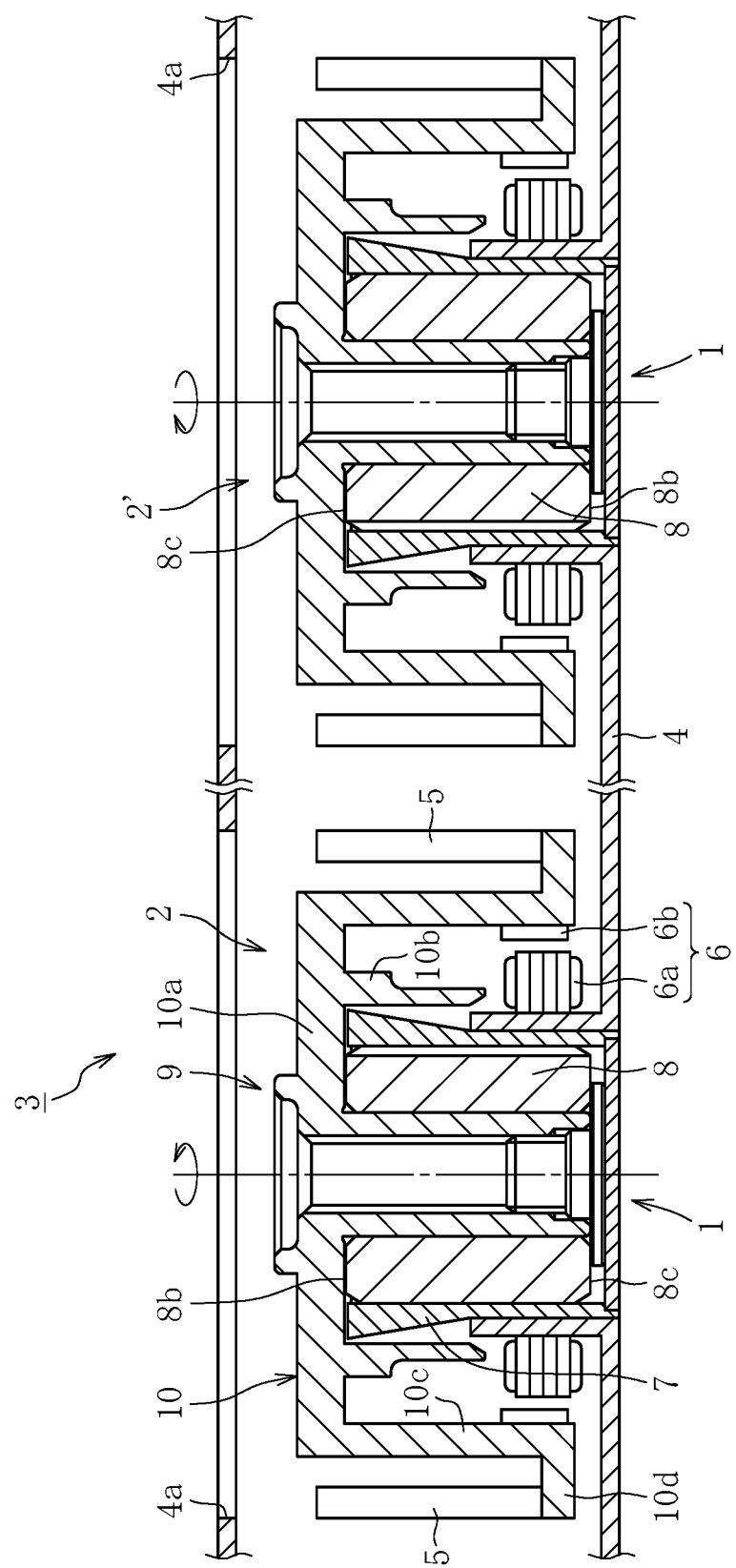
FIG. 1 is a schematic view for illustrating an information apparatus having a fan motor mounted therein according to an embodiment of the present invention.

FIG. 1 is a schematic sectional view for illustrating a fan motor 2 comprising a fluid-dynamic bearing device 1 according to the present invention, and an information apparatus 3 having the fan motor 2 mounted therein. The fan motor 2 is a fan motor 2 of what is called a centrifugal type, and is mounted to a base 4 of a component to be cooled (information apparatus 3). In this embodiment, a total of two fan motors 2 and 2' of two types that differ in rotation direction from each other are built in one by one.

Of those, one fan motor 2 (hereinafter the one fan motor 2 rotates forward and the other fan motor 2' rotates reversely from the one fan motor 1) comprises the fluid-dynamic bearing device 1, a plurality of fans (blades) 5 mounted to a rotary member 9 of the fluid-dynamic bearing device 1, and a drive portion 6 configured to rotate the fans 5 integrally with the rotary member 9. The drive portion 6 comprises coils 6a and magnets 6b opposed to each other across a radial gap. In this embodiment, the coils 6a are fixed to a stationary side (base 4), and the magnets 6b are fixed to a rotary side (hub portion 10 of the rotary member 9).

Through energization of the coils 6a, an excitation force is generated between the coils 6a and the magnets 6b so that the magnets 6b are rotated. With this, the plurality of fans 5 arranged upright along an outer rim of the rotary member 9 (in this embodiment, hub portion 10) are rotated integrally with the rotary member 9. This rotation causes the fans 5 to generate air flow to a radially outer side. In a manner of being drawn by the air flow through a port 4a of the base 4 arranged on an axially upper side with respect to the fan motor 2, intake air flow is generated toward an axially lower side. With the air flow generated in the information apparatus 3 in this manner, heat generated in the information apparatus 3 can be dissipated to an outside (cooling can be performed).

Figure 2:
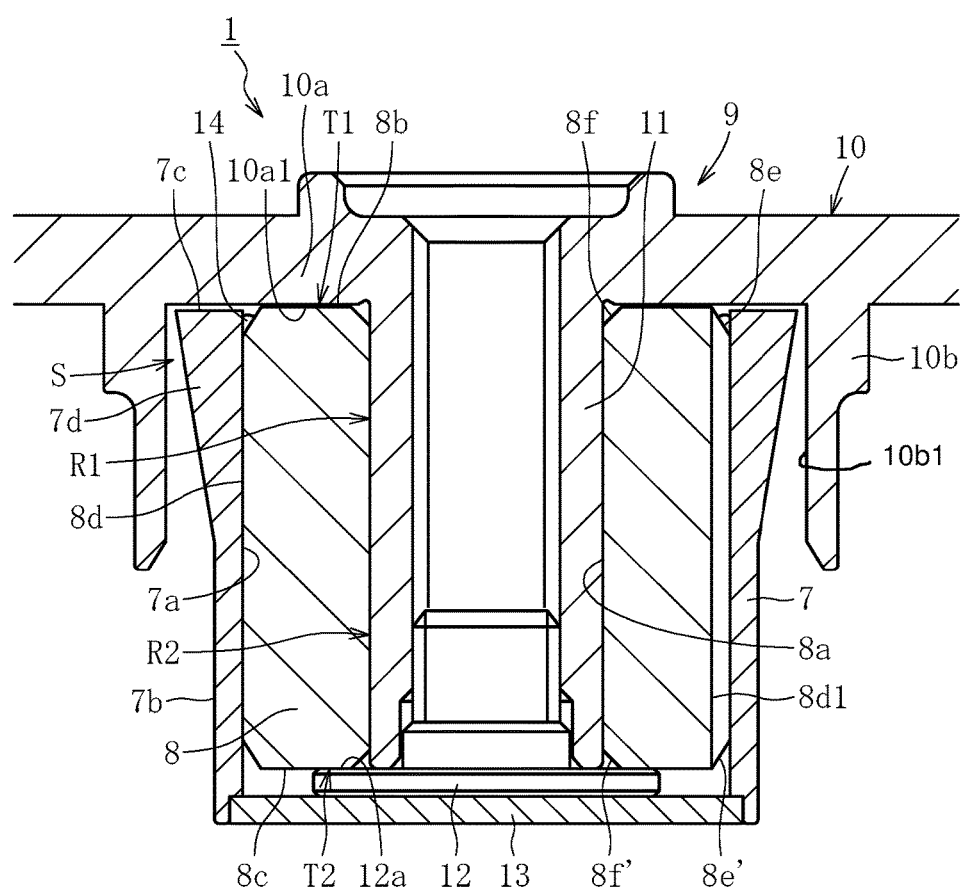
FIG. 2 is a sectional view for illustrating a fluid-dynamic bearing device constructing the motor of FIG. 1.

FIG. 2 is a sectional view for illustrating the fluid-dynamic bearing device 1 built in the fan motor 2. The fluid-dynamic bearing device 1 mainly comprises a housing 7, a sintered metal bearing 8 fixed to an inner periphery of the housing 7, and the rotary member 9 to be rotated relative to the sintered metal bearing 8.

The rotary member 9 comprises the hub portion 10 arranged on an upper-end opening side of the housing 7, and a shaft portion 11 inserted along an inner periphery of the sintered metal bearing 8.

The hub portion 10 comprises a disc portion 10a covering the upper-end opening side of the housing 7, a first cylindrical portion 10b extending from the disc portion 10a to the axially lower side, a second cylindrical portion 10c located on the radially outer side with respect to the first cylindrical portion 10b and extending from the disc portion 10a to the axially lower side, and a flange portion 10d further extending from an axially lower end of the second cylindrical portion 10c to the radially outer side. The disc portion 10a is opposed to one end surface (upper end surface 8b) of the sintered metal bearing 8 fixed to the inner periphery of the housing 7. Thus, according to this embodiment, the disc portion 10a corresponds to an end-surface facing portion. Further, the plurality of fans 5 are formed integrally with the hub portion 10 in an upright posture along an outer rim of the flange portion 10d.

In this embodiment, the shaft portion 11 is formed integrally with the hub portion 10, and a flange portion 12 is arranged separately at a lower end thereof. In this case, an upper end surface 12a of the flange portion 12 is opposed to another end surface (lower end surface 8c) of the sintered metal bearing 8. As a matter of course, the shaft portion 11 and the hub portion 10 may be formed separately from each other. In that case, by methods such as press-fitting and bonding, an upper end of the shaft portion 11 may be fixed to a hole formed at a center of the hub portion 10. Alternatively, one of the shaft portion 11 and the hub portion 10 to be made of materials different from each other may be formed through injection molding of a metal or a resin with another one of the shaft portion 11 and the hub portion 10 being used as an insert component.

The housing 7 is formed into a cylindrical shape opened at both axial ends thereof, and a lower-end opening side thereof is sealed by a lid member 13. Further, the housing 7 has an inner peripheral surface 7a fixed to the sintered metal bearing 8, and an outer peripheral surface 7b fixed to the base 4 of the information apparatus 3. An axial opposing clearance between an upper end surface 7c of the housing 7 and a lower end surface 10a1 of the disc portion 10a of the hub portion 10 is larger than an opposing clearance between the upper end surface 8b of the sintered metal bearing 8 and the lower end surface 10a1 of the disc portion 10a. In this embodiment, the opposing clearances are set so as to have sizes that do not substantially have influence on increase in torque loss during rotational drive.

A tapered sealing surface 7d increased in outer diameter dimension as approaching to the upper side is formed on an upper side of an outer periphery of the housing 7. An annular sealing space S gradually reduced in radial dimension from a closed side (lower side) toward an opening side (upper side) of the housing 7 is formed between the tapered sealing surface 7d and an inner peripheral surface 10b1 of the first cylindrical portion 10b. During rotation of the shaft portion 11 and the hub portion 10, the sealing space S is communicated to a radially outer side of a thrust bearing gap in a first thrust bearing portion T1 described later, thereby allowing a lubricating oil to flow in a bearing interior space comprising other bearing gaps. Further, a charging amount of the lubricating oil is adjusted so that an oil surface (gas-liquid interface) of the lubricating oil is constantly maintained within the sealing space S under a state in which the lubricating oil is filled in the bearing interior space.

Figure 3:
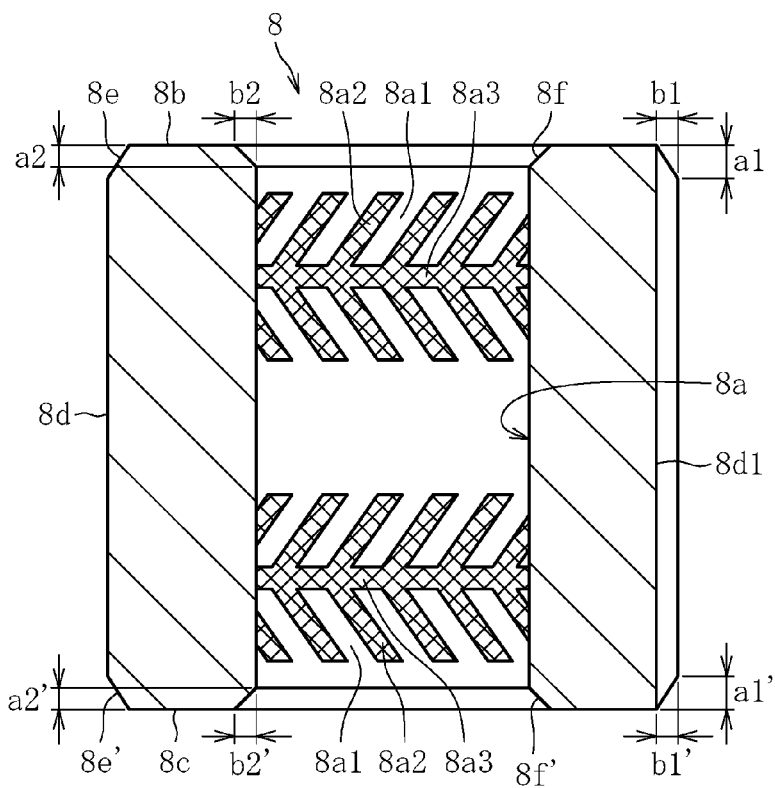
FIG. 3 is a sectional view for illustrating a sintered metal bearing according to the embodiment of the present invention.

The sintered metal bearing 8 is formed of a porous body of a sintered metal obtained through compression molding and sintering of raw-material powder containing, as main components, metals such as copper (comprising not only pure copper but also copper alloys) and iron (comprising not only pure iron but also iron alloys such as stainless steel). In general, the sintered metal bearing 8 is formed into a circular cylindrical shape. In a part or an entirety of an inner peripheral surface 8a of the sintered metal bearing 8, an array region of a plurality of dynamic pressure generating grooves 8a1 is formed as a dynamic pressure generating portion. According to this embodiment, as illustrated in FIG. 3, in the array region of the dynamic pressure generating grooves 8a1, the plurality of dynamic pressure generating grooves 8a1 inclined at a predetermined angle with respect to a circumferential direction, inclined ridge portions 8a2 partitioning those dynamic pressure generating grooves 8a1 from each other in the circumferential direction, and belt portions 8a3 extending in the circumferential direction and partitioning the dynamic pressure generating grooves 8a1 from each other in the axial direction are arrayed in a herringbone pattern (both of the inclined ridge portions 8a2 and the belt portions 8a3 are indicated by cross-hatching in FIG. 3). Two array regions of the dynamic pressure generating grooves 8a1 are formed away from each other in the axial direction. In this case, both an upper array region of the dynamic pressure generating grooves 8a1 and a lower array region of the dynamic pressure generating grooves 8a1 are formed so as to be axially symmetrical with respect to a center line extending along the circumferential direction (imaginary line along an axial center part of the belt portion 8a3 extending along the circumferential direction), and are equal to each other in axial dimension.

Figure 4A:
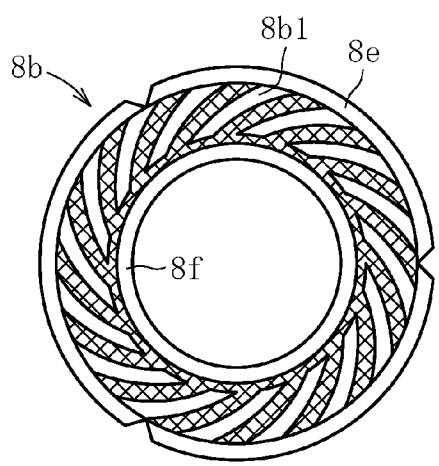
FIG. 4A is a view for illustrating an upper end surface of the sintered metal bearing illustrated in FIG. 3 as viewed from an upper side in an axial direction.

In a part or an entirety of the upper end surface 8b of the sintered metal bearing 8, an array region of a plurality of dynamic pressure generating grooves 8b1 is formed as a dynamic pressure generating portion. In this embodiment, for example, as illustrated in FIG. 4A, there is formed a region in which the plurality of dynamic pressure generating grooves 8b1 extending in a spiral pattern are arrayed in the circumferential direction. In this case, an orientation of the spiral of the dynamic pressure generating grooves 8b1 is set to an orientation corresponding to a forward rotation direction of the rotary member 9. Under a state in which the fluid-dynamic bearing device 1 illustrated in FIG. 2 is driven to rotate, the thrust bearing gap of the first thrust bearing portion T1 described later is formed between the array region of the dynamic pressure generating grooves 8b1 configured as described above and the opposed lower end surface 10a1 of the disc portion 10a of the hub portion 10.

Figure 4B:
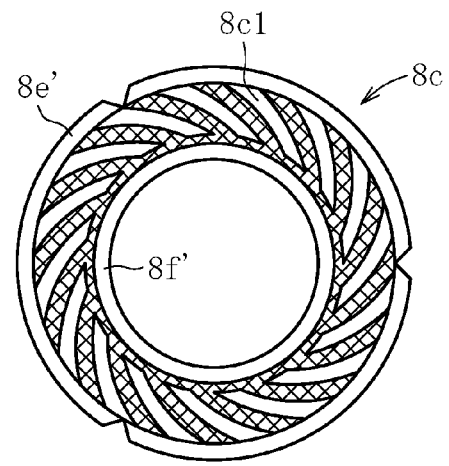
FIG. 4B is a view for illustrating a lower end surface of the sintered metal bearing illustrated in FIG. 3 as viewed from a lower side in the axial direction.

Further, in a part or an entirety of the lower end surface 8c of the sintered metal bearing 8, an array region of a plurality of dynamic pressure generating grooves 8c1 is formed as a dynamic pressure generating portion. In this embodiment, for example, as illustrated in FIG. 4B, there is formed a region in which the plurality of dynamic pressure generating grooves 8c1 extending in a spiral pattern are arrayed in the circumferential direction. In this case, an orientation of the spiral of the dynamic pressure generating grooves 8c1 is set to an orientation corresponding to a reverse rotation direction of the rotary member 9 under a state in which the sintered metal bearing 8 is inverted upside down so that the lower end surface 8c faces the lower end surface of the hub portion 10 (refer to fan motor 2' of FIG. 1). Thus, in a setting example illustrated in FIG. 2, the orientation of the spiral of the dynamic pressure generating grooves 8c1 is set to an orientation corresponding to a forward rotation direction of the flange portion 12 of the rotary member 9 (orientation that allows a dynamic pressure to be generated between the lower end surface 8c and the flange portion 12). Thus, under the state in which the fluid-dynamic bearing device 1 illustrated in FIG. 2 is driven to rotate, a thrust bearing gap of a second thrust bearing portion T2 described later is formed between the array region of the dynamic pressure generating grooves 8c1 configured as described above and the opposed upper end surface 12a of the flange portion 12 (refer to FIG. 2).

The thrust bearing gaps are automatically formed at a time point when the fluid-dynamic bearing device 1 is assembled. Specifically, under a state in which the fluid-dynamic bearing device 1 is assembled as illustrated in FIG. 2, the flange portion 12 and the disc portion 10a of the hub portion 10 are arranged at positions of axially sandwiching the sintered metal bearing 8 fixed to the housing 7. Thus, a sum of both the thrust bearing gaps is set equal to a value obtained through subtraction of an axial dimension of the sintered metal bearing 8 from an opposing clearance between the lower end surface 10a1 of the hub portion 10 and the upper end surface 12a of the flange portion 12.

In an outer peripheral surface 8d of the sintered metal bearing 8, one or a plurality of axial grooves 8d1 (three in this embodiment) are formed. Under a state in which the sintered metal bearing 8 is fixed to the housing 7, passages for a lubricating oil are formed between the axial grooves 8d1 and the inner peripheral surface 7a of the housing 7 (refer to FIG. 2).

Further, an outer chamfered portion 8e (8e') and an inner chamfered portion 8f (8f') each having a predetermined shape are formed respectively along an outer rim and an inner rim of each of both the end surfaces 8b and 8c of the sintered metal bearing 8. The upper end surface 8b and the outer peripheral surface 8d are continuous with each other through intermediation of the outer chamfered portion 8e, and the lower end surface 8c and the outer peripheral surface 8d are continuous with each other through intermediation of the outer chamfered portion 8e'. The upper end surface 8b and the inner peripheral surface 8a are continuous with each other through intermediation of the inner chamfered portion 8f, and the lower end surface 8c and the inner peripheral surface 8a are continuous with each other through intermediation of the inner chamfered portion 8f'.

Specifically, the outer chamfered portion 8e (8e') arranged along the outer rim of each of the upper end surface 8b and the lower end surface 8c is formed so that its axial dimension a1 (a1') is larger than its radial dimension b1 (b1') (FIG. 3). Further, a difference a1-a1' (absolute value) in axial dimension is larger than a difference b1-b1' (absolute value) in radial dimension between the outer chamfered portions 8e and 8e' of the upper end surface 8b and the lower end surface 8c. More specifically, the outer chamfered portions 8e and 8e' on both the upper and lower sides are formed so that the difference a1-a1' in axial dimension is 0.05 mm or more and 0.10 mm or less, for example. Further, the outer chamfered portions 8e and 8e' on both the upper and lower sides are formed so that the difference b1-b1' in radial dimension is 0.02 mm or less. In order to satisfy such a dimensional relationship, each of the outer chamfered portions 8e and 8e' is inclined at an angle of more than 45 degrees with respect to the upper end surface 8b or the lower end surface 8c.

In this way, the outer chamfered portions 8e and 8e' are formed along the outer rims of both the end surfaces 8b and 8c (in particular, upper end surface 8b) of the sintered metal bearing 8. Thus, for example, when the sintered metal bearing 8 is fixed through bonding to the inner periphery of the housing 7, a space between the outer chamfered portion 8e (8e') and the inner peripheral surface 7a of the housing 7 functions as a kind of an adhesive agent reservoir. In other words, at the time when the sintered metal bearing 8 is fixed through bonding to the housing 7, normally, a predetermined amount of adhesive agent 14 is applied in advance to the inner peripheral surface 7a of the housing 7, and then the sintered metal bearing 8 is introduced from one axial side (for example, lower end side) of the housing 7. At this time, the adhesive agent 14 applied to the inner peripheral surface 7a of the housing 7 is forced out forward by the sintered metal bearing 8 in its introduction direction. Meanwhile, the adhesive agent 14 is retained within the space formed between the outer chamfered portion 8e of the upper end surface 8b and the inner peripheral surface 7a of the housing 7. Thus, when the space has a size sufficiently larger than an amount of the adhesive agent 14 to be forced out so that the adhesive agent 14 is retained therein, a risk in that the adhesive agent 14 enters a space on the upper end surface 8b of the sintered metal bearing 8 can be reduced.

Meanwhile, each of the inner chamfered portions 8f and 8f' arranged along the inner rims of the upper end surface 8b and the lower end surface 8c are formed so that its axial dimension a2 and its radial dimension b2 are equal to each other (FIG. 3). Further, in this embodiment, each of the inner chamfered portions 8f and 8f' is formed so that at least the axial dimension a2 (a2') of the inner chamfered portion 8*f* (8*f*') is smaller than the axial dimension a1 (a1') of the outer chamfered portion 8*e* (8*e*').

In the fluid-dynamic bearing device 1 configured as described above (in bearing interior space), the lubricating oil is filled as a lubricating fluid. Note that, lubricating oils of various types may be used. Specifically, an ester-based lubricating oil that has a low evaporation rate and is not liable to be reduced in viscosity at low temperature is suitably used.

In the fluid-dynamic bearing device 1 configured as described above, during the rotation of the shaft portion 11 (rotary member 9), the regions on the inner peripheral surface 8*a* of the sintered metal bearing 8 (two upper and lower array regions of the dynamic pressure generating grooves 8*a*1), which serve as a radial bearing surface, are opposed to an outer peripheral surface of the shaft portion 11 across a radial bearing gap. Then, along with the rotation of the shaft portion 11, the lubricating oil in the radial bearing gap is forced toward an axial center in each of the array regions of the dynamic pressure generating grooves 8*a*1. With this, a pressure of the lubricating oil is increased in a region on an axial center side. By such a dynamic pressure action of the dynamic pressure generating grooves 8*a*1, a first radial bearing portion R1 and a second radial bearing portion R2 configured to radially support the shaft portion 11 in a freely rotatable and non-contact manner are formed.

Further, in the thrust bearing gap between the upper end surface 8*b* of the sintered metal bearing 8 (array region of the dynamic pressure generating grooves 8*b*1) and the opposed lower end surface 10*a*1 of the hub portion 10, an oil film of the lubricating oil is formed by a dynamic pressure action of the dynamic pressure generating grooves 8*b*1. Further, in the thrust bearing gap between the lower end surface 8*c* of the sintered metal bearing 8 (array region of the dynamic pressure generating grooves 8*c*1) and the opposed upper end surface 12*a* of the flange portion 12, an oil film of the lubricating oil is formed by a dynamic pressure action of the dynamic pressure generating grooves 8*c*1. Then, by pressures of those oils films, the first thrust bearing portion T1 and the second thrust bearing portion T2 configured to support the rotary member 9 in a non-contact manner in both thrust directions are formed.

Now, with reference mainly to FIG. 5 to FIG. 7B, description is made of an example of a method of manufacturing the sintered metal bearing 8 described above.

Specifically, a method for producing the sintered metal bearing 8 configured as described above mainly comprises a compacting step (S1) of subjecting raw-material powder to compression molding to obtain a molded green compact, a sintering step (S2) of sintering the molded green compact to obtain a sintered compact 8', and a dynamic pressure generating groove sizing step (S3) of sizing the sintered compact 8' and molding the dynamic pressure generating grooves 8*a*1 as the dynamic pressure generating portion at least in the inner peripheral surface 8*a* of the sintered compact 8'. In this embodiment, as steps after the sintering step (S2) and before the dynamic pressure generating groove sizing step (S3), the sintered metal bearing 8 further comprises a dimension sizing step (S031) of performing dimension sizing on the sintered compact 8', and a rotary sizing step (S032) of performing rotary sizing on the inner peripheral surface 8*a* of the sintered compact 8'. Description of the steps (S1) to (S3) is made with a focus on the dynamic pressure generating groove sizing step (S3).

(S1) Compacting Step

First, the raw-material powder is prepared as a material for the sintered metal bearing 8 to be finished into a complete product, and then is compressed into a predetermined shape through die press molding. Specifically, although not shown, the compression molding of the raw-material powder is performed by using a molding die set comprising a die, a core pin to be inserted and arranged into a hole of the die, a lower punch arranged between the die and the core pin, and configured to be capable of being raised and lowered relative to the die, and an upper punch configured to be capable of being displaced (raised and lowered) relative to both the die and the lower punch. In this case, the raw-material powder is charged into a space defined by an inner peripheral surface of the die, an outer peripheral surface of the core pin, and an upper end surface of the lower punch. Then, under a state in which the lower punch is fixed, the upper punch is lowered so that the charged raw-material powder is pressurized in the axial direction. Next, under the pressurized state, the upper punch is lowered to a predetermined position so that the raw-material powder is compressed into a predetermined axial dimension. In this way, the molded green compact is obtained.

Further, at this time, although not shown, along outer rims and inner rims of a lower end surface of the upper punch and the upper end surface of the lower punch, molding dies are formed in advance in conformity with patterns of the outer chamfered portions 8*e* and 8*e*' and the inner chamfered portions 8*f* and 8*f*' to be molded. Then, the compression molding of the raw-material powder is performed as described above. With this, a molded green compact having a shape in conformity with that of a complete product (cylindrical shape) is obtained. In addition, the outer chamfered portions 8*e* and 8*e*' and the inner chamfered portions 8*f* and 8*f*' are molded at corresponding positions on the molded green compact.

(S2) Sintering Step

After the molded green compact is obtained as described above, this molded green compact is sintered at a temperature appropriate to the raw-material powder. With this, the sintered compact 8' is obtained.

(S031) Dimension Sizing Step and (S032) Rotary Sizing Step

Figure 5:
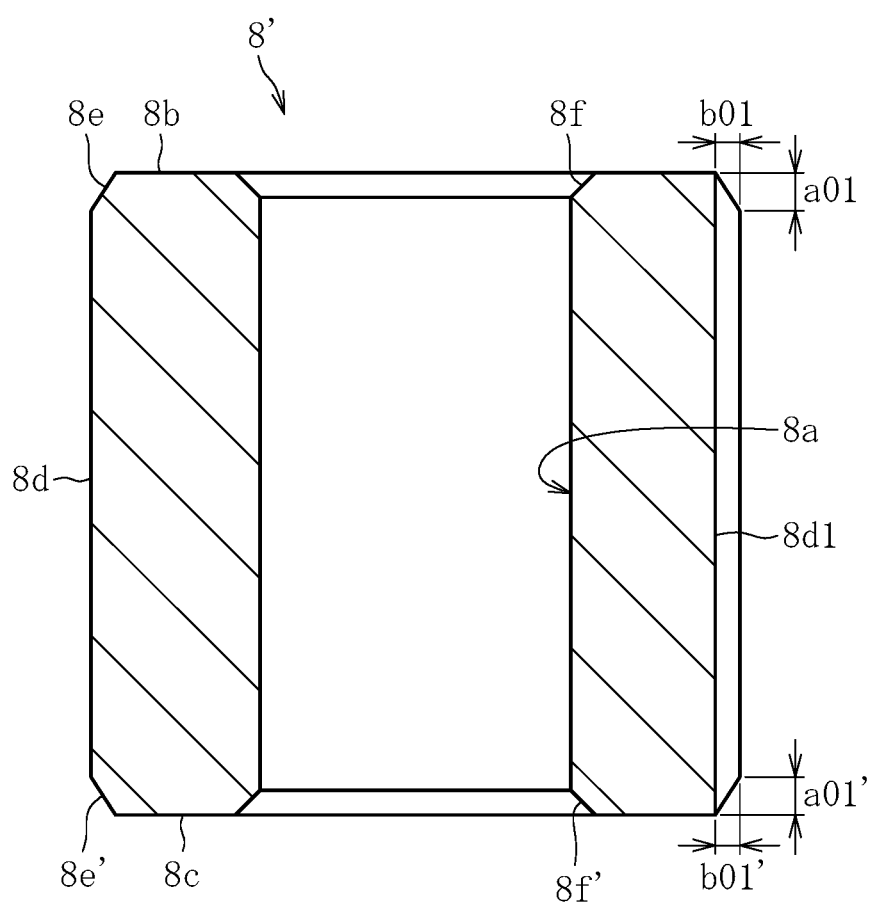
FIG. 5 is a sectional view for illustrating a sintered compact obtained through compression molding and sintering of raw-material powder of the sintered metal bearing.

Then, the dimension sizing is performed on the sintered compact 8' so that an outer diameter dimension, an inner diameter dimension, and an axial dimension of the sintered compact 8' are corrected into dimensions in accordance with those of a complete product. In addition, the surface porosity of the inner peripheral surface 8*a* is adjusted to a ratio appropriate to a fluid-dynamic bearing. At this stage, the predetermined array regions of the dynamic pressure generating grooves 8*a*1 have not yet been formed in the inner peripheral surface 8*a* of the sintered compact 8' (FIG. 5). Similarly, although not shown, the predetermined array regions of the dynamic pressure generating grooves 8*b*1 and 8*c*1 have not yet been formed in both the end surfaces 8*b* and 8*c* of the sintered compact 8'. Thus, at the time of the dimension sizing and the rotary sizing, the sintered compact 8' can be put into the molding die set irrespective of the upper side or the lower side.

(S3) Dynamic Pressure Generating Groove Sizing Step

Figure 6A:
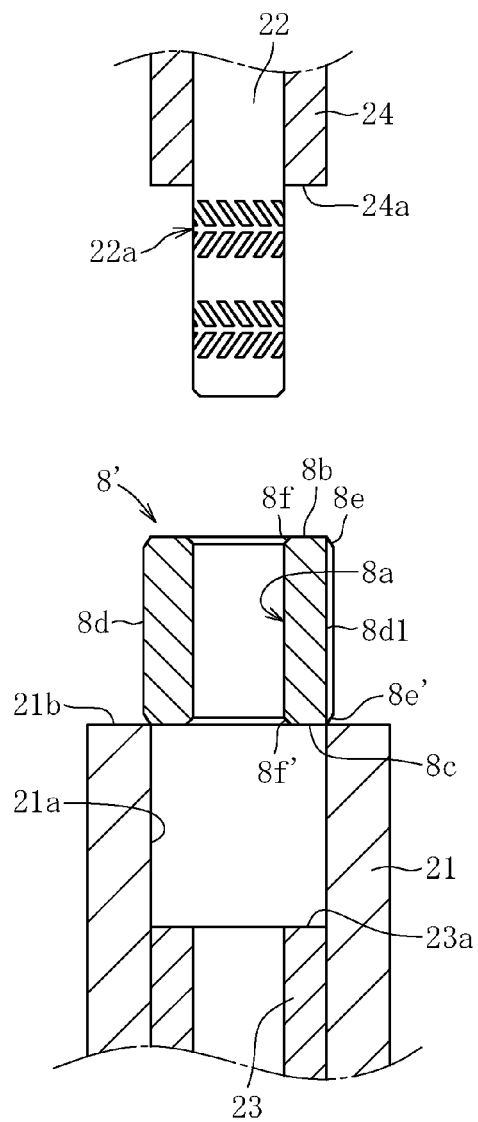
FIG. 6A is an explanatory sectional view for illustrating a sizing step for the sintered compact illustrated in FIG. 5, specifically, illustrating a state before insertion of a sizing pin.

Through predetermined dynamic pressure generating groove sizing on the sintered compact 8' that is obtained through the series of steps described above, the array regions of the dynamic pressure generating grooves 8*a*1 are molded in the inner peripheral surface 8*a* of the sintered compact 8'. As illustrated in FIG. 6A, a molding apparatus used in this case comprises a die 21 having a press-fit hole 21*a* for the sintered compact 8', a sizing pin 22 arranged so as to be insertable into the press-fit hole 21a of the die 21, a lower punch 23 arranged between the die 21 and the sizing pin 22, and configured to be capable of being raised and lowered relative to the die 21, and an upper punch 24 configured to be capable of being raised and lowered relative to both the die 21 and the lower punch 23. In this case, an inner diameter dimension of the press-fit hole 21a of the die 21 is appropriately set in accordance with a press-fitting margin of the sintered compact 8' to be subjected to the sizing. Further, on an outer peripheral surface of the sizing pin 22, there is formed a first molding die in conformity with the patterns of the array regions of the dynamic pressure generating grooves 8a1 of the inner peripheral surface 8a to be molded (FIG. 6). On a lower end surface 24a of the upper punch 24 and an upper end surface 23a of the lower punch 23, there are respectively formed a second molding die and a third molding die in conformity with the patterns of the array region of the dynamic pressure generating grooves 8b1 of the upper end surface 8b to be molded, and the array region of the dynamic pressure generating grooves 8c1 of the lower end surface 8c to be molded (not shown). Note that, the lower end surface 24a of the upper punch 24 is formed so as to be larger in outer diameter dimension than the upper end surface 8b of the sintered compact 8' so that the outer chamfered portion 8e arranged along the outer rim of the upper end surface 8b can be pressed at the time of an operation of lowering the upper punch 24 so as to pressurize the upper end surface 8b. Similarly to the upper punch 24, the upper end surface 23a of the lower punch 23 is formed so as to be larger in outer diameter dimension than the lower end surface 8c of the sintered compact 8' so that the outer chamfered portion 8e' arranged along the outer rim of the lower end surface 8c can be pressed at the time of pressurizing the lower end surface 8c.

Figure 6B:
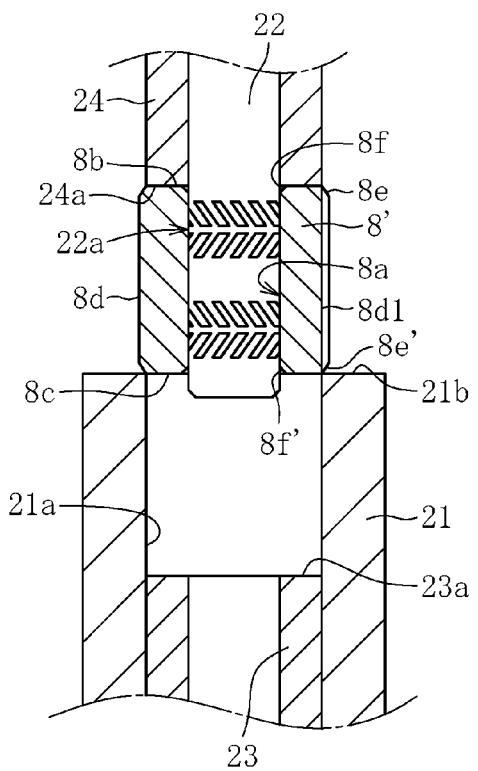
FIG. 6B is another explanatory sectional view for illustrating the sizing step for the sintered compact illustrated in FIG. 5, specifically, illustrating a state at the time of starting press-fitting of the sintered compact into a die.
Figure 7A:
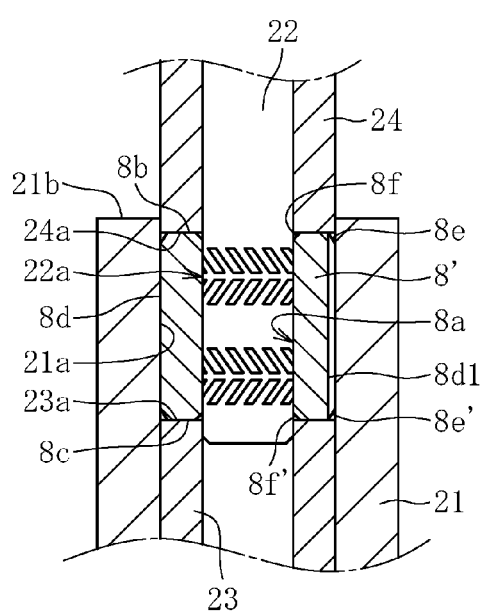
FIG. 7A is still another explanatory sectional view for illustrating the sizing step for the sintered compact illustrated in FIG. 5, specifically, illustrating a state at a time point when the press-fitting of the sintered compact into the die is completed.

Next, description is made of an example of the dynamic pressure generating groove sizing using the molding apparatus described above. First, as illustrated in FIG. 6A, the sintered compact 8' is arranged on the upper end surface 21b of the die 21, and in this state, the upper punch 24 and the sizing pin 22 are lowered from above. With this, the sizing pin 22 is inserted along an inner periphery of the sintered compact 8' so that a first molding die 22a formed in advance on the outer periphery of the sizing pin 22 is radially opposed to an inner peripheral surface 8a. Then, when the first molding die 22a reaches a predetermined axial position on the inner peripheral surface 8a, the upper punch 24 and the sizing pin 22 are further lowered so that an upper end surface 8b of the sintered compact 8' is pressed (FIG. 6B). With this, the sintered compact 8' is pressed into the press-fit hole 21a of the die 21 so that an outer peripheral surface 8d of the sintered compact 8' is compressed, and the first molding die 22a of the sizing pin 22 inserted along the inner periphery in advance is caused to bite into the inner peripheral surface 8a. Further, in this state, the upper punch 24 is further lowered so that the sintered compact 8' is sandwiched between the upper punch 24 and the lower punch 23, thereby axially compressing the sintered compact 8' under a state in which radially outward deformation thereof is restricted by the die 21. With this, the first molding die 22a is caused to further bite into the inner peripheral surface 8a (FIG. 7A). In this way, the pattern of the first molding die 22a is transferred onto the inner peripheral surface 8a so that the array regions of the dynamic pressure generating grooves 8a1 are molded. Further, at this time, the second molding die formed on the lower end surface 24a of the upper punch 24 and the third molding die formed on the upper end surface 23a of the lower punch 23 are caused to bite respectively into the upper end surface 8b and the lower end surface 8c of the sintered compact 8'. With this, the patterns of the second molding die and the third molding die are transferred respectively onto the upper end surface 8b and the lower end surface 8c. In this way, the array regions of the dynamic pressure generating grooves 8b1 and 8c1 are correspondingly molded.

Figure 7B:
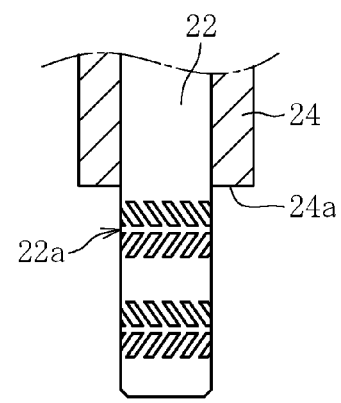
FIG. 7B is yet another explanatory sectional view for illustrating the sizing step for the sintered compact illustrated in FIG. 5, specifically, illustrating a state at a time point when the sintered compact is released from the die.
Figure 7B:
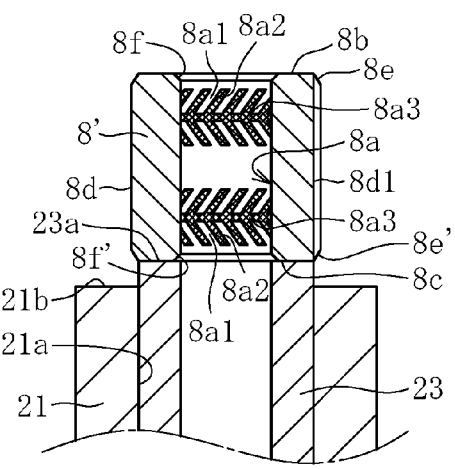

After the predetermined array regions of the dynamic pressure generating grooves 8a1 to 8c1 are molded respectively in the inner peripheral surface 8a and both the end surfaces 8b and 8c of the sintered compact 8' in this way, the die 21 is lowered relative to the lower punch 23 so that the sintered compact 8' is released from the restriction by the die 21 (FIG. 7B). With this, the sintered compact 8' is caused to spring back radially outward. As a result, outer diameter dimensions of the outer peripheral surface 8d and the outer chamfered portions 8e and 8e' are increased. Further, by raising the upper punch 24 so that the sintered compact 8' is released from the axial restriction by the upper punch 24 and the lower punch 23 (FIG. 7B), the sintered compact 8' is caused to axially spring back. As a result, axial dimensions of the outer peripheral surface 8d and the outer chamfered portion 8e are increased. Further, in this case, dimensions such as the inner diameter dimension of the press-fit hole 21a of the die 21, a closest distance between the lower end surface 24a of the upper punch 24 and the upper end surface 23a of the lower punch 23, and the dimensions of the outer chamfered portions 8e and 8e' of the sintered compact 8' are set so that a value of 0.25 or more and 1.5 or less, or more preferably 0.5 or more and 1.0 or less is obtained when an axial sizing amount of each of the outer chamfered portions 8e and 8e' (variation amounts $a1-a01$ and $a1'-a01'$ of the axial dimensions of the outer chamfered portions 8e and 8e' before and after the dynamic pressure generating groove sizing) is divided by a radial sizing amount of the same (variation amounts $b1-b01$ and $b1'-b01'$ of the radial dimensions of the outer chamfered portions 8e and 8e' before and after the dynamic pressure generating groove sizing). Note that, the above-mentioned value (ratio) is calculated based on the axial sizing amount $a1-a01$ ($a1'-a01'$) and the radial sizing amount $b1-b01$ ($b1'-b01'$) of the same outer chamfered portion 8e (8e'). Further, in each of the outer chamfered portions 8e and 8e' on the upper end side and the lower end side, the above-mentioned value is set to fall within the above-mentioned ranges. The sintered compact 8' obtained in this way has the same shape and the same size as those of a complete product, and as described above, the difference $a1-a1'$ in axial dimension between the outer chamfered portions 8e and 8e' on the upper end side and the lower end side is set to 0.05 mm or more and 0.10 mm or less. Further, as described above, the difference $b1-b1'$ in radial dimension is set to 0.02 mm or less.

In sizing steps of this type, in order to allow the sizing pin 22 to be smoothly withdrawn after the dynamic pressure generating grooves 8a1 are molded in the inner peripheral surface 8a of the sintered compact 8', the spring-back needs to be caused by an appropriate amount in a radial direction. However, the spring-back is inherently difficult to strictly control in amount because of its nature. Further, as described above, the sintered compact 8' is pressed from one of the upper side and the lower side with respect to the sintered compact 8' (in this embodiment, pressed by the upper punch 24). Thus, an upper side and a lower side of the sintered compact 8' are liable to be pressed in non-uniform states. As a countermeasure, in the present invention, the axial sizing amounts are intentionally set larger than those in the related art. Specifically, the value to be obtained through the division of the axial sizing amount a1–a01 (a1'–a01') of the outer chamfered portion 8e (8e') by the radial sizing amount b1–b01 (b1'–b01') is set to 0.25 or more and 1.5 or less (in the related art, less than 0.25). With this, even when the axial dimensions a1 (a1') of the outer chamfered portions 8e (8e') at upper and lower ends after the sizing are somewhat different from each other, the difference b1–b1' in radial dimension can be set as small as possible (0.02 mm or less) in contrast thereto. With this, the dynamic pressure generating grooves 8a1 having a sufficient size (depth) can be formed in the inner peripheral surface 8a, and a fluctuation of each of the radial dimensions b1 and b1' of the outer chamfered portions 8e and 8e' at the upper and lower ends can be suppressed. Thus, the radial dimensions b1 and b1' themselves can be designed so as to be smaller than those in the related art. As a result, each of the end surfaces 8b and 8c is allowed to have a sufficiently large thrust bearing area. Irrespective of which of the end surfaces 8b (8c) is used as a thrust bearing surface (in each of the left fan motor 2 and the right fan motor 2' illustrated in FIG. 1), a required thrust bearing rigidity can be exerted.

Further, in the present invention, the axial dimension a1 (a1') of the outer chamfered portion 8e (8e') is set larger than the radial dimension b1 (b1') of the same, and the difference a1–a1' in axial dimension between the outer chamfered portions 8e and 8e' on one end side and another end side in the axial direction is set larger than the difference b1–b1' in radial dimension. In this way, by designing the shapes of the outer chamfered portions 8e and 8e' in accordance with elaborate setting of the axial dimensions a1 and a1', the radial dimensions b1 and b1' of the outer chamfered portions 8e and 8e' can be reduced, and the difference in radial dimension between the upper end side and the lower end side can be reduced as much as possible. With this, areas of both the end surfaces 8b and 8c arranged on a radially inner side with respect to the outer chamfered portions 8e and 8e' can be set relatively large. In this way, the thrust bearing areas can be secured. Further, in bearings 8 of this type, there is a design margin (allowable range) of the dimension in the axial direction relative to a dimension in the radial direction. Thus, even when the axial dimension a1 (a1') is set relatively large, there is no problem with a bonding strength. In this way, according to the present invention, the outer chamfered portions 8e and 8e' that not only provide thrust bearing performance and radial bearing performance as described above but also secure the strength of bonding to the housing 7 can be designed.

The sintered metal bearing 8 and a method of manufacturing the sintered metal bearing 8 according to the present invention are not limited to those in the above description of the embodiment of the present invention. As a matter of course, various modifications and changes may be made thereto within the scope of the present invention.

For example, in the case exemplified in the embodiment described above, the array regions of the dynamic pressure generating grooves 8a1 are molded on the inner peripheral surface 8a through the dynamic pressure generating groove sizing step involving press-fitting the sintered compact 8' into the die 21, and axially compressing the sintered compact 8' with the upper punch 24 and the lower punch 23. When possible, the array regions of the dynamic pressure generating grooves 8a1 may be formed on the inner peripheral surface 8a of the sintered compact 8' only through axial compression without performing the press-fitting into the die 21. Further, how the upper punch 24 and the lower punch 23 are moved at the time of the axial compression is not limited to that exemplified in the embodiment described above. For example, there may be employed other pressing methods. Specifically, under the state in which the sintered compact 8' is axially compressed to some extent between the lowered upper punch 24 and the lower punch 23, the lower punch 23 may be raised so that the sintered compact 8' is further compressed.

Figure 8:
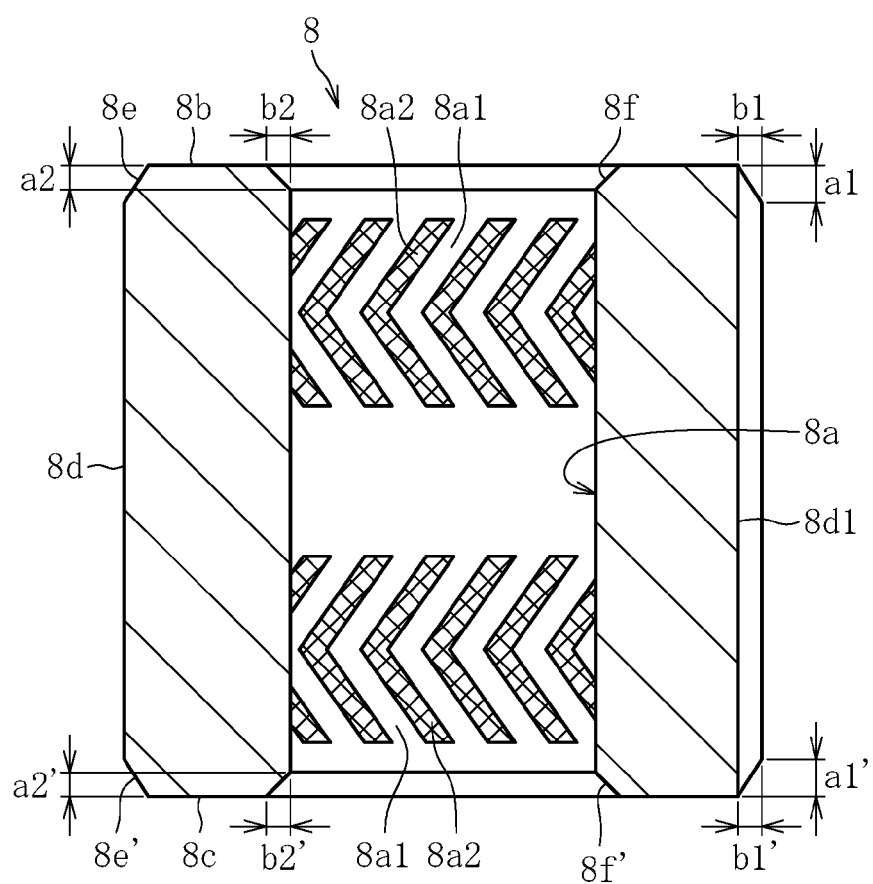
FIG. 8 is a sectional view for illustrating a sintered metal bearing according to another embodiment of the present invention.

Further, in the case exemplified in the embodiment described above, the plurality of dynamic pressure generating grooves 8a1, the inclined ridge portions 8a2 partitioning those dynamic pressure generating grooves 8a1 from each other in the circumferential direction, and the belt portions 8a3 extending in the circumferential direction and partitioning the dynamic pressure generating grooves 8a1 from each other in the axial direction are arrayed in the herringbone pattern so as to serve as the dynamic pressure generating portions on the inner peripheral surface 8a. As a matter of course, the invention of the present application is applicable also to array regions of the dynamic pressure generating grooves 8a1 in other patterns. Specifically, as illustrated in FIG. 8, there may be employed a configuration in which the belt portions 8a3 are omitted so that both the dynamic pressure generating grooves 8a1 and the inclined ridge portions 8a2 are continued along the axial direction. Further, the same applies to the dynamic pressure generating portion on the upper end surface 8b or the lower end surface 8c. Specifically, the array regions of the dynamic pressure generating grooves 8b1 or 8c1 need not necessarily be formed into the spiral pattern, and the array regions of the dynamic pressure generating grooves 8b1 or 8c1 may be formed into other patterns.

Still further, in the case exemplified in the embodiment described above, the dynamic pressure generating grooves 8a1 of the inner peripheral surface 8a of the sintered metal bearing 8 are formed flush with the inner peripheral surface 8a and the upper end surface 8b (or lower end surface 8c) continuous to the outer chamfered portion 8e (8e') (in the exemplified case, a region between the array regions of the dynamic pressure generating grooves 8a1 is formed flush with the dynamic pressure generating grooves 8a1). However, the dynamic pressure generating grooves 8a1 and the partition portions for the dynamic pressure generating grooves 8a1 (inclined ridge portions 8a2 and belt portions 8a3, for example) may be molded so that the partition portions are formed flush with the inner peripheral surface 8a and the upper end surface 8b or the lower end surface 8c.

Still further, the fluid-dynamic bearing device 1 according to the present invention is applicable not only to the fan motor 2 of the centrifugal type as exemplified above, but also to fan motors 2 of other types such as an axial-flow type. As a matter of course, the fluid-dynamic bearing device 1 may be suitably used not only as bearing devices to be used for driving the fan motors 2, but also as bearing devices to be used for driving various motors comprising a polygon scanner motor for laser beam printers, and a small motor for the information apparatus 3, which is used in high-speed rotation, such as a spindle motor to be used in disk drives such as an HDD, and a spindle motor to be used for driving magneto-optical discs of optical discs. In this case, as a matter of course, the present invention is applicable also to uses other than those requiring the upside-down inversion.

REFERENCE SIGNS LIST 1 fluid-dynamic bearing device
2, 2' fan motor
3 information apparatus
4 base 5 fan
6 drive portion
7 housing
7a inner peripheral surface
8 sintered metal bearing
8' sintered compact
8a inner peripheral surface
8a1 dynamic pressure generating groove (inner peripheral surface)
8a2 inclined ridge portion
8a3 belt portion
8b upper end surface
8b1 dynamic pressure generating groove (upper end surface)
8c lower end surface
8c1 dynamic pressure generating groove (lower end surface)
8e, 8e' outer chamfered portion
8f, 8f' inner chamfered portion
9 rotary member
10 hub portion
10a disc portion
10a1 lower end surface
12 flange portion
13 lid member
14 adhesive agent
21 die
21a press-fit hole
22 sizing pin
22a first molding die
23 lower punch
24 upper punch
a1, a1', a01, a01' axial dimension (outer chamfered portion)
a2, a2' axial dimension (inner chamfered portion)
b1, b1', b01, b01' radial dimension (outer chamfered portion)
b2, b2' radial dimension (inner chamfered portion)
R1, R2 radial bearing portion
T1, T2 thrust bearing portion
S sealing space

The invention claimed is:

1. A sintered metal bearing that is formed through sintering of a compact obtained through compression molding of raw-material powder, the sintered metal bearing comprising:
   chamfered portions that are respectively formed at least along outer rims of both end surfaces of the sintered metal bearing; and
   a dynamic pressure generating portion formed on an inner peripheral surface of the sintered metal bearing by sizing,
   wherein an axial dimension of each of the chamfered portions is set larger than a radial dimension of the each of the chamfered portions, and
   wherein a difference in axial dimension between the chamfered portions on one end side and another end side in an axial direction of the sintered metal bearing is set larger than a difference in radial dimension between the chamfered portions on the one end side and the another end side in the axial direction.

2. The sintered metal bearing according to claim 1, wherein the difference in axial dimension between the chamfered portions is set to 0.05 mm or more and 0.1 mm or less, and
   wherein the difference in radial dimension between the chamfered portions is set to 0.02 mm or less.

3. A fluid-dynamic bearing device, comprising:
   the sintered metal bearing of claim 2;
   a shaft portion inserted along an inner periphery of the sintered metal bearing; and
   an end-surface facing portion configured to be rotated integrally with the shaft portion and to face any one of the end surfaces of the sintered metal bearing,
   wherein the sintered metal bearing comprises:
     a dynamic pressure generating portion formed on the one end surface of the sintered metal bearing, the dynamic pressure generating portion having a pattern that corresponds to forward rotation of the shaft portion under a state in which the one end surface is arranged so as to face the end-surface facing portion; and
     a dynamic pressure generating portion formed on the another end surface of the sintered metal bearing, the dynamic pressure generating portion having a pattern that corresponds to reverse rotation of the shaft portion under a state in which the another end surface is arranged so as to face the end-surface facing portion.

4. The fluid-dynamic bearing device according to claim 3, further comprising a housing having an inner peripheral surface to which the sintered metal bearing is fixed with an adhesive agent,
   wherein the adhesive agent is retained between the inner peripheral surface of the housing and corresponding one of the chamfered portions.

5. A fluid-dynamic bearing device, comprising:
   the sintered metal bearing of claim 1;
   a shaft portion inserted along an inner periphery of the sintered metal bearing; and
   an end-surface facing portion configured to be rotated integrally with the shaft portion and to face any one of the end surfaces of the sintered metal bearing,
   wherein the sintered metal bearing comprises:
     a dynamic pressure generating portion formed on the one end surface of the sintered metal bearing, the dynamic pressure generating portion having a pattern that corresponds to forward rotation of the shaft portion under a state in which the one end surface is arranged so as to face the end-surface facing portion; and
     a dynamic pressure generating portion formed on the another end surface of the sintered metal bearing, the dynamic pressure generating portion having a pattern that corresponds to reverse rotation of the shaft portion under a state in which the another end surface is arranged so as to face the end-surface facing portion.

6. The fluid-dynamic bearing device according to claim 5, further comprising a housing having an inner peripheral surface to which the sintered metal bearing is fixed with an adhesive agent,
   wherein the adhesive agent is retained between the inner peripheral surface of the housing and corresponding one of the chamfered portions.

7. A fan motor, comprising:
   the fluid-dynamic bearing device of claim 6; and
   a fan mounted to the shaft portion.

8. An information apparatus, comprising the fan motor of claim 7,
   wherein the fan motor comprises two types of fan motors that differ in rotation direction of the fan from each other.

9. A fan motor, comprising:
the fluid-dynamic bearing device of claim 5; and
a fan mounted to the shaft portion.

10. An information apparatus, comprising the fan motor of claim 9,
wherein the fan motor comprises two types of fan motors that differ in rotation direction of the fan from each other.

11. A method of manufacturing a sintered metal bearing, comprising the steps of:
subjecting raw-material powder to compression molding to obtain a molded green compact;
sintering the molded green compact to obtain a sintered compact; and
sizing the sintered compact so as to mold a dynamic pressure generating portion on an inner peripheral surface of the sintered compact,
wherein the subjecting raw-material powder to compression molding comprises molding chamfered portions respectively at least along outer rims of both end surfaces of the molded green compact, and
wherein the sizing the sintered compact is performed so that a value of 0.25 or more and 1.5 or less is obtained when an axial sizing amount of each of the chamfered portions is divided by a radial sizing amount of the each of the chamfered portions.

12. The method of manufacturing a sintered metal bearing according to claim 11, wherein a value of 0.5 or more and 1.0 or less is obtained when the axial sizing amount of each of the chamfered portions is divided by the radial sizing amount of the each of the chamfered portions.

13. The method of manufacturing a sintered metal bearing according to claim 12, wherein the subjecting raw-material powder to compression molding comprises molding the chamfered portions so that an axial dimension of each of the chamfered portions of the molded green compact is larger than a radial dimension of the each of the chamfered portions of the molded green compact.

14. The method of manufacturing a sintered metal bearing according to claim 11, wherein the subjecting raw-material powder to compression molding comprises molding the chamfered portions so that an axial dimension of each of the chamfered portions of the molded green compact is larger than a radial dimension of the each of the chamfered portions of the molded green compact.

* * * * *